US 9,050,955 B2

(12) United States Patent
Kunz et al.

(10) Patent No.: US 9,050,955 B2
(45) Date of Patent: Jun. 9, 2015

(54) HYDRAULIC VEHICLE BRAKING SYSTEM, VEHICLE HAVING SUCH A BRAKING SYSTEM, AND METHOD FOR OPERATING A HYDRAULIC VEHICLE BRAKING SYSTEM

(75) Inventors: Michael Kunz, Steinheim an der Murr (DE); Stefan Strengert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 450 days.

(21) Appl. No.: 13/387,283

(22) PCT Filed: May 31, 2010

(86) PCT No.: PCT/EP2010/057509
§ 371 (c)(1),
(2), (4) Date: Apr. 9, 2012

(87) PCT Pub. No.: WO2011/012346
PCT Pub. Date: Feb. 3, 2011

(65) Prior Publication Data
US 2012/0193973 A1     Aug. 2, 2012

(30) Foreign Application Priority Data
Jul. 27, 2009    (DE) .......................... 10 2009 028 028

(51) Int. Cl.
| | |
|---|---|
| B60T 13/16 | (2006.01) |
| B60T 13/14 | (2006.01) |
| B60T 8/48 | (2006.01) |
| B60T 1/10 | (2006.01) |
| B60T 8/26 | (2006.01) |
| B60T 8/40 | (2006.01) |
| B60T 8/44 | (2006.01) |
| B60T 13/58 | (2006.01) |

(52) U.S. Cl.
CPC ............ *B60T 8/4872* (2013.01); *B60T 13/142* (2013.01); *B60T 1/10* (2013.01); *B60T 8/268* (2013.01); *B60T 8/4081* (2013.01); *B60T 8/442* (2013.01); *B60T 13/586* (2013.01)

(58) Field of Classification Search
CPC ..... B60T 13/585; B60T 13/586; B60T 13/14; B60T 13/16; B60T 13/142; B60T 8/4081; B60T 8/409
USPC ............................ 303/113.4, 117.1, 151–152
See application file for complete search history.

(56) References Cited

U.S. PATENT DOCUMENTS

| | | | | |
|---|---|---|---|---|
| 6,464,307 B1 * | 10/2002 | Yoshino | .......................... | 303/11 |
| 7,722,135 B2 * | 5/2010 | Yang | .............................. | 303/152 |
| 2007/0126282 A1 * | 6/2007 | Hwang | .......................... | 303/10 |

FOREIGN PATENT DOCUMENTS

| | | |
|---|---|---|
| CN | 1746061 | 3/2006 |
| DE | 103 24 246 | 12/2004 |

(Continued)

OTHER PUBLICATIONS

International Search Report issued in PCT/EP2010/057509, dated Aug. 28, 2010.

*Primary Examiner* — Anna Momper
(74) *Attorney, Agent, or Firm* — Kenyon & Kenyon LLP

(57) ABSTRACT

A hydraulic vehicle brake system has a pedal travel simulator having a primary chamber and a secondary chamber, between which a piston is situated so as to be displaceable, the secondary chamber being fluidically connected to a storage chamber. Brake fluid from the storage chamber is able to be supplied via a hydraulic pump.

17 Claims, 3 Drawing Sheets

(56) References Cited

FOREIGN PATENT DOCUMENTS

| DE | 10 2007 020503 | 11/2008 |
| EP | 1 103 436 | 5/2001 |
| EP | 1 795 413 | 6/2007 |
| WO | 94/25322 | 11/1994 |
| WO | 98/31576 | 7/1998 |
| WO | WO 2008/074448 | 6/2008 |

* cited by examiner

HYDRAULIC VEHICLE BRAKING SYSTEM, VEHICLE HAVING SUCH A BRAKING SYSTEM, AND METHOD FOR OPERATING A HYDRAULIC VEHICLE BRAKING SYSTEM

FIELD OF THE INVENTION

The present invention relates to a hydraulic vehicle braking system and to a method for operating a hydraulic vehicle braking system.

BACKGROUND INFORMATION

German patent document DE 10 2007 020 503 A1 discusses a hydraulic vehicle braking system, which is equipped with two brake circuits, which can be actuated via a shared master brake cylinder by means of a brake pedal of the vehicle. Each brake circuit acts on two wheel brake units at the vehicle wheels. The vehicle braking system has a hydraulic pump unit having a separate hydraulic pump for each brake circuit, and a shared electric motor which actuates both hydraulic pumps. Driver assistance systems such as an electronic stability program ESP can be supported via the control of the pump unit.

In hydraulic braking systems which are used as drive source in hybrid vehicles having an electric motor and an internal combustion engine, there arises the problem that an electrical brake torque that is acting on the vehicle is produced in recuperation or generator operation of the electric motor, which must be taken into account in the braking process when actuating the mechanically acting wheel brake. Since the recuperative brake is available only if the electrical energy store is not fully charged, brake situations with and without electrical brake torque may arise, depending on the charge state of the electrical energy store. Since the brake torques stemming from the different brake devices have a cumulative effect on the vehicle, the lack of or the connection of an electrical brake torque must be compensated by the driver by a modified mechanical brake torque, which requires a change in the brake pedal setting.

SUMMARY OF THE INVENTION

An objective of the exemplary embodiments and/or exemplary methods of the present invention is to further develop the brake process in a vehicle equipped with a hydraulic vehicle braking system, in such a way that the driver is unaware of a supplementary brake torque acting on the vehicle.

According to the exemplary embodiments and/or exemplary methods of the present invention, this objective is achieved in a hydraulic vehicle braking system by the features described herein, and in a method for operating a hydraulic vehicle braking system, by the features described herein. The further descriptions herein indicate expedient refinements.

In a manner known per se, the hydraulic vehicle braking system according to the present invention is provided with a master brake cylinder, which is actuable by a brake pedal in the vehicle; furthermore, at least one storage chamber for accommodating the hydraulic brake fluid, a hydraulic pump, and at least one wheel brake unit are provided in a brake circuit of the vehicle braking system. In addition, the vehicle braking system includes a pedal travel simulator, which is provided with a primary chamber and a secondary chamber and a displaceable piston, which separates the two chambers. The primary chamber is fluidically connected to the master brake cylinder or a reservoir assigned to the master brake cylinder, and the secondary chamber is connected to the storage chamber for accommodating the hydraulic brake fluid. Furthermore, the hydraulic pump is connected to the storage chamber, and the hydraulic pump is controllable via actuating signals from a regulation or control unit for generating a wheel brake torque in the wheel brake unit.

Through the pedal travel simulator and the storage chamber in the fluid path between the secondary chamber of the simulator and the hydraulic pump, decoupling between the actuation of the brake pedal by the driver and the pressure application of the wheel brake units is achieved. The pedal travel of the brake pedal and/or the pedal pressure generated by the driver are/is utilized for determining a setpoint brake torque; the displacement of hydraulic fluid from the master brake cylinder that took place via the pedal travel does not have a direct effect in the wheel brake unit; instead, hydraulic fluid is displaced into the downstream storage unit via the pedal travel simulator. When actuated, the hydraulic pump aspirates hydraulic fluid from the storage chamber and applies brake pressure to the fluid, which brake pressure becomes effective in the wheel brake unit.

The control of the hydraulic pump via the actuating signals from the regulation or control unit allows for a variable adaptation to the individual actual braking situation in the vehicle. The actuation of the hydraulic pump is thus not necessarily coupled to the actuation of the brake pedal, so that other influences are able to be taken into account in the control of the hydraulic pump. In particular, it is possible to consider supplementary brake torques generated by supplementary braking devices, especially by electric motors which are disposed in the drive train of the vehicle and run during recuperative operation. The supplementary brake torques of such supplementary braking devices and the mechanical brake torques generated in the wheel brake units of the vehicle braking system by actuation of the hydraulic pump determine the overall brake torque, which corresponds to the setpoint brake torque input by the driver via the pedal actuation. Variations in the supplementary brake torques are able to be compensated via corresponding control of the hydraulic pump, without the driver becoming aware of it. This concerns the case, for example, where a recuperative electrical brake torque increases or decreases, is connected or switched off. The driver perceives this neither in the pedal actuation nor in the vehicle deceleration.

During a regular braking operation—with or without supplementary brake torque from a supplementary brake device—the actuation of the brake pedal causes hydraulic fluid to be routed from the master brake cylinder to the primary chamber of the pedal travel simulator, whereupon the piston in the pedal travel simulator is shifted in the direction of the secondary chamber and, due to the volume decrease of the secondary chamber, hydraulic fluid contained therein is displaced into the downstream storage chamber. When the hydraulic pump is triggered, it aspirates hydraulic fluid from the storage chamber and applies the brake pressure determined in the regulation or control unit to the hydraulic fluid. For a fully active pressure buildup without pedal actuation by the driver, e.g., for aiding a driver assistance system such as an ESP (electronic stability program), for instance, the hydraulic pump is advantageously connected to the master brake cylinder or the reservoir assigned to this cylinder, via a valve which is closed in the currentless state and supplies hydraulic fluid from the reservoir to the brake circuit.

In order to obtain a direct hydraulic communication between the master brake cylinder and the wheel brake units in emergency cases, the primary chamber of the pedal travel simulator is expediently connected via an adjustable hydraulic valve to the brake circuit including the at least one wheel brake unit. For practical purposes, the secondary chamber is connected to the storage chamber by way of a blockable actuation device. The hydraulic valve connected downstream from the primary chamber may be configured as valve which is open in the deenergized state, which is in the opening position when the electric current supply malfunctions, so that the primary chamber of the pedal travel simulator is hydraulically connected to the wheel brake units. The actuation device assigned to the secondary chamber, on the other hand, is closed when no current flows, so that the connection between the secondary chamber of the pedal travel simulator and the storage chamber is interrupted in the event of a malfunction of the current supply.

According to a first development, the blockable actuation device which lies in the flow route between the secondary chamber of the pedal travel simulator and the storage chamber is developed as adjustable hydraulic valve connected downstream from the secondary chamber, which is closed in the currentless state. According to a second, alternative development, the actuation device is integrated into the pedal travel simulator, the piston being part of the actuation device; in response to a displacement of the piston between the initial position and the position shifted in the direction of the secondary chamber, the flow route to the storage chamber is unblocked. For instance, this is realized in that, in the initial position, in which no hydraulic fluid has yet been supplied from the master brake cylinder to the primary chamber of the pedal travel simulator, a portion of the piston closes a discharge opening in the direction of the post-connected storage chamber. The displacement of the piston in the direction of the secondary chamber opens the discharge opening, so that a fluid connection exists between the secondary chamber and the storage chamber, and the further displacement of the piston causes the hydraulic fluid contained in the secondary chamber to be shifted into the storage chamber. This development is characterized by a compact design and a low number of components; furthermore, no electrical component is required to open and close the discharge opening in the secondary chamber of the pedal travel simulator.

It basically suffices to integrate the pedal travel simulator together with the assigned components into only a single brake circuit of the vehicle braking system, while a normally provided second brake circuit is implemented in the conventional manner, without such a pedal travel simulator. In an axle-specific division of the brake circuits, in which a first brake circuit acts upon the wheel brake units on the front axle, and the second brake circuit acts on the wheel brake units on the rear axle, this makes it possible to distribute wheel brake torques of different magnitude per vehicle axle. This is achieved by appropriate control of the hydraulic pump or of the electromotive drive acting upon the hydraulic pump.

The provision of a shared electromotive drive for one hydraulic pump per brake circuit is sufficient. A torque distribution among the brake circuits is able to be realized by closing a hydraulic valve between the reservoir of the master brake cylinder and the brake circuit without pedal travel simulator. In addition, however, implementations are possible in which a separate electromotive drive is assigned to each hydraulic pump.

According to an additional useful development, it is also possible to implement a brake force distribution among the wheel brake units of this brake circuit within the brake circuit equipped with the pedal travel simulator, in that the intake and discharge valves of each wheel brake unit are controlled in different manners.

The hydraulic vehicle braking system may be used in hybrid vehicles which have an electric motor and an internal combustion engine as drive source. The charging of the electric energy store requires the electric motor to be operated in recuperation or generator operation, in which electrical brake torques, which have a decelerating effect on the drive train, become effective in the electric motor. The electrical brake torques are added to the mechanical wheel brake torques generated via the hydraulic vehicle braking system. Due to the fact that the hydraulic vehicle braking system is equipped with the pedal travel simulator, whose secondary side communicates with the storage chamber, the hydraulic pump supplying hydraulic fluid from the storage chamber in the direction of the wheel brake units, a corresponding hydraulic brake pressure is able to be generated depending on the application of the hydraulic pump, which brake pressure manifests itself in a corresponding mechanical wheel brake torque.

Basically, the hydraulic vehicle braking system according to the present invention is also usable in vehicles that have an electric motor as exclusive drive source.

The hydraulic vehicle braking system may have a pedal travel simulator together with the associated components in only one brake circuit. Another basic possibility, however, is an implementation in which both brake circuits are equipped with a separate pedal travel simulator and the associated components.

The method according to the present invention assumes that a hydraulic vehicle braking system is available which has a pedal travel simulator having a primary chamber and a secondary chamber and a displaceable piston situated in-between in at least one brake circuit, the secondary chamber being fluidically connected to a storage chamber, and hydraulic fluid from the storage chamber being able to be supplied to the brake circuit via a hydraulic pump. The method is carried out in such a way that, in a first method step, a setpoint brake torque that corresponds to the driver input is first determined from the brake pedal position. In a next method step, it is then determined whether, and to what extent, a supplementary brake torque is currently generated in a supplementary brake device. In an additional method step, the hydraulic pump is finally actuated such that the wheel brake torque generated via the wheel brake unit is calculated from the difference between the setpoint brake torque specified by the driver and the supplementary brake torque. This procedure ensures that the setpoint brake torque desired by the driver is effective at all times, regardless of a currently applied supplementary brake torque. Moreover, due to the special development of the one brake circuit having the pedal travel simulator, decoupling between the brake pedal pressure and the brake pressure of the hydraulic fluid in the brake circuit is achieved.

Further advantages and expedient implementations can be gathered from the further claims, the description of figures and the drawing.

DETAILED DESCRIPTION

Figure 1:
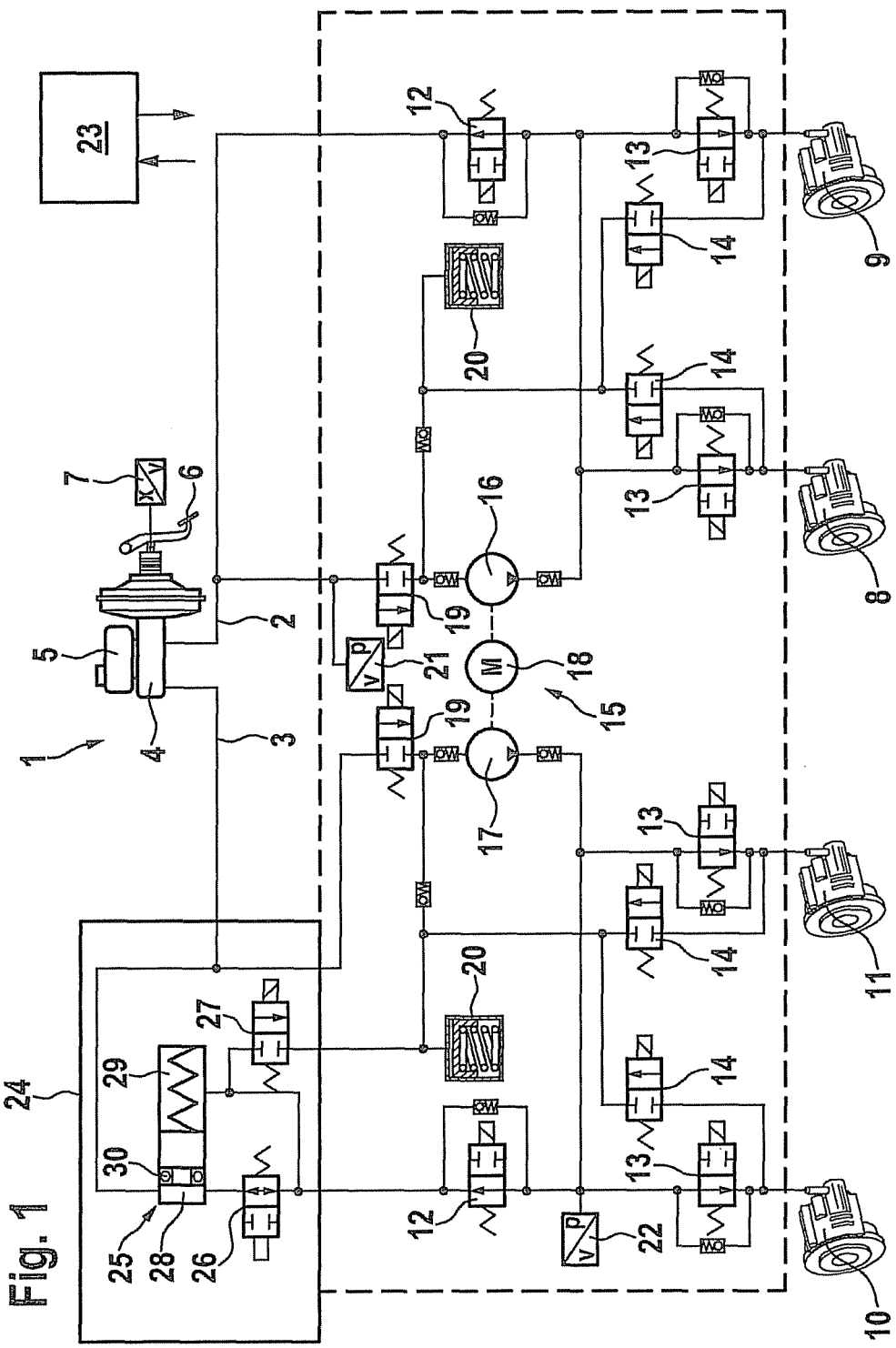
FIG. 1 shows a hydraulic circuit diagram of a vehicle braking system having a front-axle brake circuit and a rear-axle brake circuit, a pedal travel simulator having a primary chamber and a secondary chamber separated via a piston being integrated into the rear-axle brake circuit, and an individual hydraulic valve being post-connected both to the primary chamber and the secondary chamber.

Identical elements are provided with the same reference numerals in the figures.

As can be inferred from the hydraulic circuit diagram according to FIG. 1, hydraulic vehicle braking system 1 in a motor vehicle has a front axle brake circuit 2 and a rear axle brake circuit 3 which are connected to a shared master brake cylinder 4 which is able to be actuated by the driver via a brake pedal 6. Master brake cylinder 4 is assigned a brake fluid reservoir 5. The pedal travel of brake pedal 6 is ascertained with the aid of a pedal travel sensor 7. Wheel brake units 8 and 9 at the, respectively, left and right front wheel are actuated via front axle brake circuit 2, and wheel brake units 10 and 11 at the, respectively, left and right rear wheel are actuated via rear axle brake circuit 3. Each brake circuit 2, 3 is assigned a controllable switchover valve 12, which is connected to master brake cylinder 4, the switchover valves being open in their currentless basic position. Each switchover valve 12 has a non-return valve disposed in parallel, through which a flow is able to travel from the master brake cylinder to the individual wheel brake units.

Located between switchover valves 12 and individual wheel brake units 8 through 11 are intake valves 13, which are likewise open when no current is supplied. Each intake valve 13 is assigned an individual non-return valve, which is able to be traversed by a flow in the direction toward the master brake cylinder.

Wheel brake units 8 through 11 are provided with a separate discharge valve 14, which is closed in the currentless state, which are connected to the intake side of a pump unit 15; pump unit 15, which is part of an ESP system (electronic stability program), in particular, includes a first hydraulic pump 16 in front axle brake circuit 2, and a second hydraulic pump 17 in rear axle brake circuit 3, as well as an electric drive motor 18 which actuates both hydraulic pumps 16, 17 jointly. The pressure side of hydraulic pumps 16 and 17 is connected to a line segment between switchover valve 12 and the two intake valves 13 per brake circuit. The intake sides of hydraulic pumps 16 and 17 are connected to a main switching valve 19, which is hydraulically connected to master brake cylinder 4.

To implement a control intervention in terms of driving dynamics, main switching valves 19, which are closed in the currentless state, may be opened, whereupon hydraulic pumps 16 and 17 aspirate hydraulic fluid directly from master brake cylinder 4 or from associated brake fluid reservoir 5. The brake pressure generation is independent of an actuation of the brake pedal by the driver.

In addition, the intake side of hydraulic pumps 16 and 17 communicates with a hydraulic reservoir or a storage chamber 20 for accommodating brake fluid. Storage chambers 20 are furthermore fluidically connected to the line segments containing discharge valves 14. Storage chambers 20 are used for the intermediate storage of brake fluid that was discharged via discharge valves 14 from wheel brake units 8 through 11 during an intervention related to driving dynamics.

Each brake circuit 2, 3 furthermore has a pressure sensor 21 and 22, respectively, for measuring the brake pressure in the particular brake circuit. Pressure sensor 21 in front axle brake circuit 2 is situated between master brake cylinder 4 and main switching valve 19. Pressure sensor 22 in rear axle brake circuit 3 is situated between switchover valve 12 and intake valves 13.

Moreover, a regulation or control unit 23 is assigned to vehicle braking system 1, which generates actuating signals as a function of input signals, in particular for acting upon hydraulic pumps 16 and 17 or electric drive motor 18 assigned to the pumps. As input signals, the sensor signals from the sensors of the vehicle braking system are supplied to regulation or control unit 23. In addition, signals from additional power units or actuation devices in the vehicle are able to be processed in regulation or control unit 23, e.g., supplementary brake torques of supplementary braking devices outside of the hydraulic vehicle braking system, such as electrical drive motors in the drive train of the vehicle operated in generator mode.

Rear axle brake circuit 3 has a booster set 24, which is connected downstream from master brake cylinder 4 in brake circuit 3. Booster set 24 includes a pedal travel simulator 25, which is fluidically connected to master brake cylinder 4, and two hydraulic valves 26 and 27 downstream from pedal travel simulator 25, of which first hydraulic valve 26 is situated between a primary chamber 28 of pedal travel simulator 25 and switchover valve 12, and second hydraulic valve 27 is situated between a secondary chamber 29 of pedal travel simulator 25 and storage chamber 20. Primary chamber 28 of pedal travel simulator 25 is fluidically connected to master brake cylinder 4. A piston 30 is situated between primary chamber 28 and secondary chamber 29, in a manner allowing displacement. As soon as brake fluid from master brake cylinder 4 flows into primary chamber 28, piston 30 is shifted from the initial position shown in FIG. 1, in the direction of secondary chamber 29, whereupon the brake fluid contained in secondary chamber 29 drains via a discharge opening in the secondary chamber by way of open hydraulic valve 27, and is forwarded to storage chamber 20.

Hydraulic valve 26 is implemented as a valve which is open in the currentless state, hydraulic valve 27 is implemented as a valve which is closed in the currentless state, thereby realizing a backup, since in the case of currentless valves, a direct hydraulic communication exists from master brake cylinder 4 via primary chamber 28 and open hydraulic valve 26, to wheel brake units 10 and 11. At the same time, in the backup, second hydraulic valve 27 is closed when no current is flowing, so that no hydraulic fluid is able to drain from secondary chamber 29 of pedal travel simulator 25 in the direction of storage chamber 20.

In standard operating mode, hydraulic valves 26 and 27 are supplied with current, so that hydraulic valve 26 connected downstream from primary chamber 28 is closed and hydraulic valve 27 connected downstream from secondary chamber 29 is open. Upon actuation of brake pedal 6, hydraulic fluid flows from master brake cylinder 4 into primary chamber 28 of pedal travel simulator 25, whereupon piston 30 is shifted in the direction of secondary chamber 29, and the brake fluid contained therein is displaced into storage chamber 20 via open hydraulic valve 27. In response to an actuation of hydraulic pump 17, brake fluid is aspirated from storage chamber 20 and supplied at a desired brake pressure to wheel brake units 10 and 11. The brake pressure depends on the actuation of hydraulic pump 17, which is adjusted via actuating signals from regulation or control unit 23.

Figure 2:
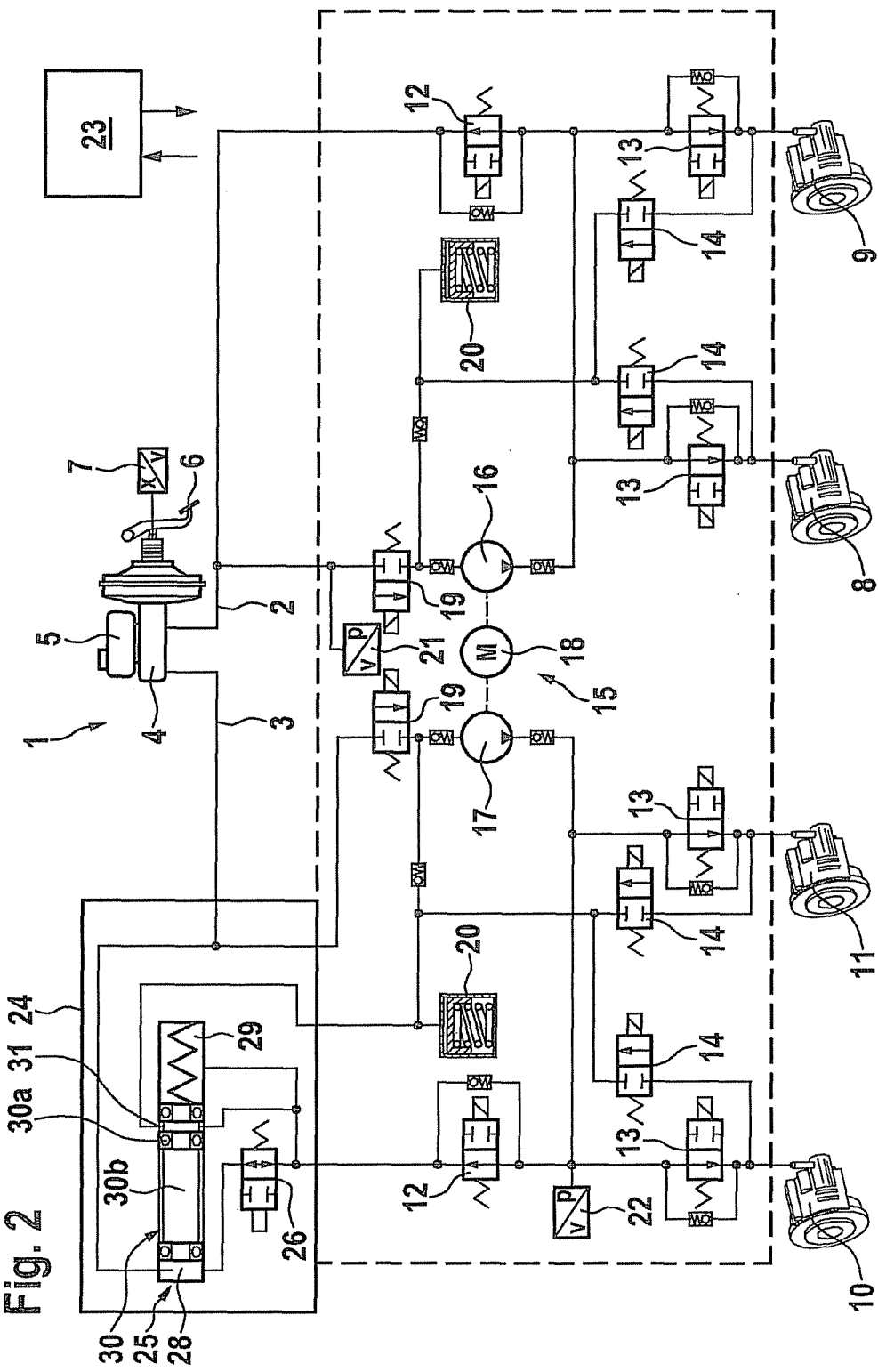
FIG. 2 shows a vehicle braking system, whose design is similar to that of the system according to FIG. 1, but which includes an actuation device, integrated into the pedal travel simulator, for opening an closing a discharge opening in the secondary chamber.

The pressure reduction is able to be implemented either via switchover valve 12 or discharge valve 14, depending on the driving situation. As a rule, the pressure reduction takes place by opening switchover valve 12, so that brake fluid from wheel brake units 10 and 11 flows into storage chamber 20 via open switchover valve 12 and likewise open hydraulic valve 27. In the event that a pressure reduction must be implemented as rapidly as possible, on the other hand, discharge valves 14 are opened, so that brake fluid from wheel brake units 10 and 11 flows directly into storage chamber 20, via open discharge valves 14. FIG. 2 shows a variant of an embodiment in which booster set 24 having pedal travel simulator 25 is implemented in modified form in comparison with the exemplary embodiment according to FIG. 1. Analogous to the first exemplary embodiment, pedal travel simulator 25 has a primary chamber 28 and a secondary chamber 29, between which displaceable piston 30 is situated. Hydraulic valve 26, which is open in the currentless state, is connected downstream from primary chamber 28.

In contrast to the first exemplary embodiment, however, no hydraulic valve is post-connected to secondary chamber 29. Instead, opening and closing of secondary chamber 29 takes place with the aid of a special development of piston 30, which is shown in FIG. 2 in its initial position in which no brake fluid from the master brake cylinder as yet has flown into primary chamber 28. In the initial position, one section 30a of piston 30 seals a discharge opening in secondary chamber 29 in the direction of storage chamber 20. As soon as brake fluid from master brake cylinder 4 flows into primary chamber 28 and piston 30 is displaced from the initial position in the direction of secondary chamber 29, a second section 30b of piston 30 arrives in the region of the discharge opening of secondary chamber 29, whereupon the discharge opening is released, so that the hydraulic fluid contained in secondary chamber 29 is able to drain into storage chamber 20.

The special design of pedal travel simulator 25 may also be utilized for pressure dissipation in rear axle brake circuit 3 in the standard case. As soon as the braking procedure has been concluded, brake fluid is routed from wheel brake units 10 and 11 via open switchover valve 12, into secondary chamber 29 of pedal travel simulator 25, the inflow opening into secondary chamber 29 being released by piston 30, which is in the open position.

Figure 3:
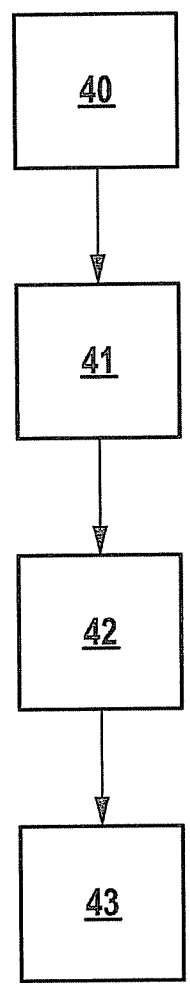
FIG. 3 shows a flow chart having individual method steps in order to implement the method for operating the vehicle braking system.

The flow chart according to FIG. 3 illustrates the sequence for implementing the method. In a first method step 40, pedal travel s traveled in an actuation of the brake pedal is first measured with the aid of the pedal travel sensor, and a setpoint brake torque $M_{Br}$ is determined therefrom. In next method step 41, it is determined whether supplementary brake torques are active in the vehicle at that point, e.g., electrical brake torques of an electric drive motor of the vehicle operating in recuperative operation. Such brake torques $M_{el}$ are detected and processed further in the regulation or control device.

Starting from setpoint brake torque $M_{Br}$ and supplementary brake torque $M_{el}$, a wheel brake torque $M_W$ for the rear axle brake circuit is determined in method step 42. Mechanical wheel brake torque $M_W$, which is generated in the wheel brake units of the rear wheels, is generated by action upon the hydraulic pump for the rear axle brake circuit, wheel brake torque $M_W$ being adjusted in such a way that, taking supplementary brake torque $M_{el}$ into account, the desired setpoint brake torque $M_{Br}$ takes effect in the vehicle. The adjustment of wheel brake torque $M_W$ takes place in method step 43, by action on the hydraulic pump for the rear axle brake circuit with the aid of the electromotive drive assigned to the hydraulic pump.

What is claimed is:

1. A hydraulic vehicle braking system, comprising:
a master brake cylinder, which is actuable by a brake pedal;
at least one storage chamber;
a hydraulic pump; and
a wheel brake unit;
wherein a pedal travel simulator having a primary chamber, which is fluidically connected to the master brake cylinder, and having a secondary chamber, which is fluidically connected to the storage chamber, is disposed in a brake circuit of the vehicle braking system, the primary and secondary chambers being separated by a displaceable piston, an intake side of the hydraulic pump being connected to the storage chamber, and having a control unit for controlling the hydraulic pump for a generation of a wheel brake torque in the wheel brake unit; and
wherein the storage chamber has no direct fluidic connection to the master brake cylinder.

2. The vehicle braking system of claim 1, wherein the primary chamber of the pedal travel simulator is connected to the wheel brake units of the brake circuit via an adjustable hydraulic valve.

3. The vehicle braking system of claim 2, wherein the hydraulic valve is implemented as a valve which is open in the currentless state.

4. The vehicle braking system of claim 1, wherein the secondary chamber of the pedal travel simulator is connected to the storage chamber via a blockable actuation device.

5. The vehicle braking system of claim 4, wherein the blockable actuation device is implemented as a hydraulic valve which is connected downstream from the pedal travel simulator.

6. The vehicle braking system of claim 4, wherein the blockable actuation device includes the piston disposed in displaceable manner between primary and secondary chamber of the pedal travel simulator, which piston is adjustable between an initial position, in which the flow route to the storage chamber is blocked, and an opening position, in which the flow route is unblocked, the opening position corresponding to the position of the piston shifted in the direction of the secondary chamber.

7. The vehicle braking system of claim 1, wherein the pedal travel simulator is integrated only into the brake circuit of one of the two vehicle axles.

8. The vehicle braking system of claim 1, wherein the hydraulic pump is connected to a hydraulic reservoir of the master brake cylinder via an adjustable hydraulic valve.

9. The vehicle braking system of claim 8, wherein the hydraulic valve is implemented as valve that is closed in the currentless state.

10. A vehicle, comprising:
a hydraulic vehicle braking system, including:
a master brake cylinder, which is actuable by a brake pedal;
at least one storage chamber;
a hydraulic pump; and
a wheel brake unit;
wherein a pedal travel simulator having a primary chamber, which is fluidically connected to the master brake cylinder, and having a secondary chamber, which is fluidically connected to the storage chamber, is disposed in a brake circuit of the vehicle braking system, the primary and secondary chambers being separated by a displaceable piston, an intake side of the hydraulic pump being connected to the storage chamber, and having a control unit for controlling the hydraulic pump for a generation of a wheel brake torque in the wheel brake unit; and
wherein the storage chamber has no direct fluidic connection to the master brake cylinder.

11. The vehicle of claim 10, wherein the vehicle is equipped with an electrical drive motor, which generates a brake torque in recuperation or generator operation.

12. The vehicle of claim 11, wherein the vehicle is configured as a hybrid vehicle and has an internal combustion engine in addition to the electrical drive motor.

13. A method for operating a hydraulic vehicle brake system that includes (I) a master brake cylinder, which is actuable by a brake pedal, (II) a storage chamber, (III) a hydraulic pump, (IV) at least one wheel brake unit, (V) a control unit, and (VI) a brake circuit in which a pedal travel simulator is disposed, wherein (1) the pedal travel simulator includes (a) a primary chamber, which is fluidically connected to the master brake cylinder, and (b) a secondary chamber, which is fluidically connected to the storage chamber, (2) the primary and secondary chambers are separated by a displaceable piston, (3) an intake side of the hydraulic pump is connected to the storage chamber, (4) the control unit is configured to control the hydraulic pump for a generation of a wheel brake torque via the at least one wheel brake unit, and (5) the storage chamber has no direct fluidic connection to the master brake cylinder, the method comprising:

determining a setpoint brake torque from a brake pedal position;

determining a supplementary brake torque generated by a supplementary braking device; and actuating the hydraulic pump so that the wheel brake torque generated via the at least one wheel brake unit is calculated from a difference between the setpoint brake torque and the supplementary brake torque.

14. The method of claim 13, wherein the supplementary brake device is an electric motor operated as generator.

15. The method of claim 13, wherein the brake circuit includes a front axle brake circuit and a rear axle brake circuit, and wheel brake torques of different magnitudes are generated in the front axle brake circuit and in the rear axle brake circuit.

16. The method of claim 13, wherein:

the at least one wheel brake unit includes:
    a first wheel brake unit (a) for a first vehicle wheel and (b) assigned to the brake circuit; and
    a second wheel brake unit (a) for a second vehicle wheel and (b) assigned to the brake circuit; and wheel brake torques of different magnitudes are generated at the first and second vehicle wheels upon actuation of the hydraulic pump, by controlling intake or discharge valves of the first and second wheel brake units.

17. The method of claim 13, wherein:

the brake circuit includes a first axle brake circuit and a second axle brake circuit;

the pedal travel simulator is disposed in the first axle brake circuit;

the at least one wheel brake unit includes:
    a first wheel brake unit (a) for a first vehicle wheel and (b) assigned to the first axle brake circuit; and
    a second wheel brake unit (a) for a second vehicle wheel and (b) assigned to the first axle brake circuit; and wheel brake torques of different magnitudes are generated at the first and second vehicle wheels upon actuation of the hydraulic pump, by controlling intake or discharge valves of the first and second wheel brake units.

\* \* \* \* \*